Figure 1:
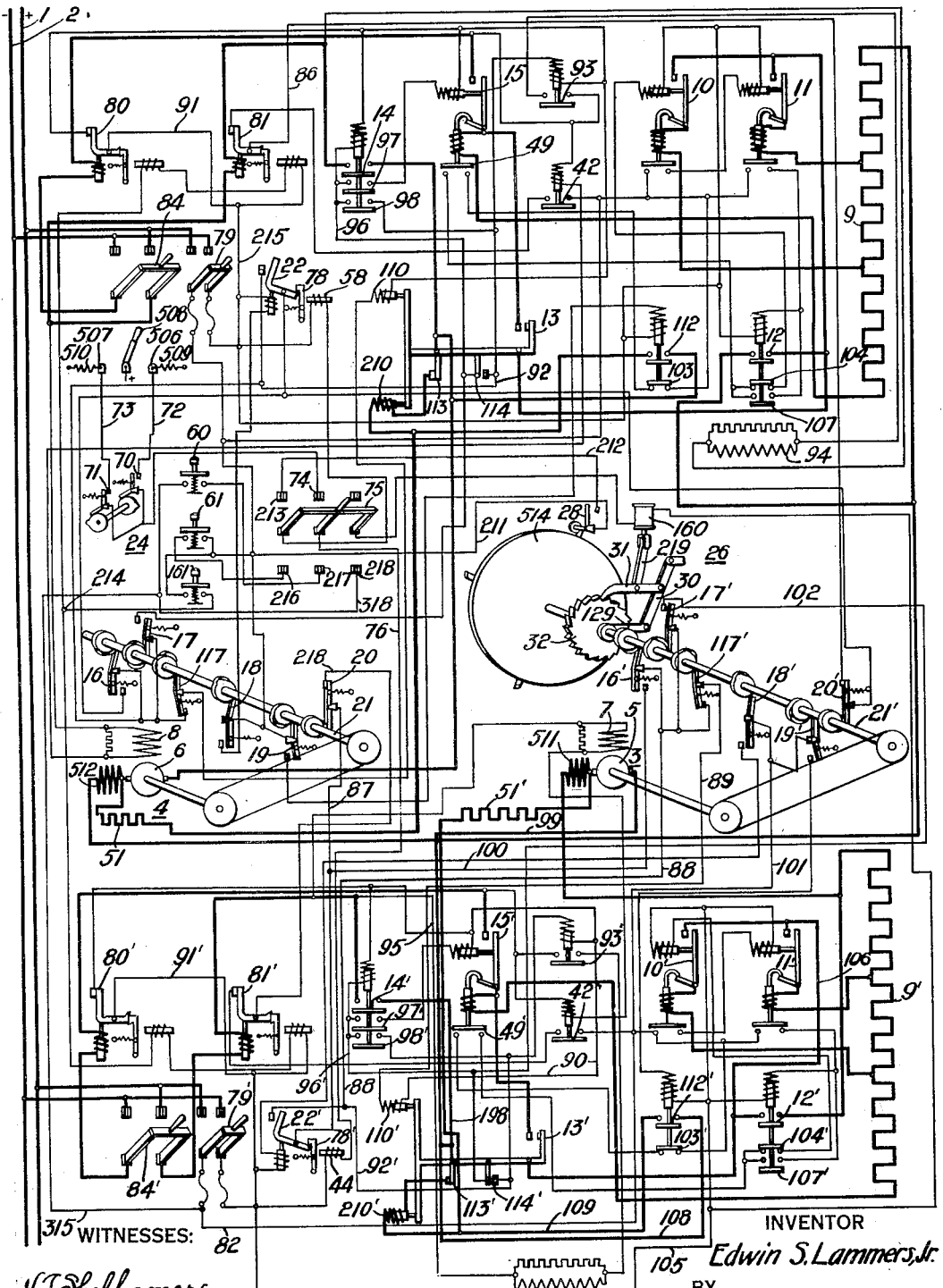

Sept. 2, 1924.  
E. S. LAMMERS, JR  
1,506,757  
CONTROL SYSTEM  
Filed May 7, 1919   2 Sheets-Sheet 1

WITNESSES:  
H.J.Shelhamer  
David Rines

INVENTOR  
Edwin S. Lammers, Jr.  
BY  
Wesley G. Carr  
ATTORNEY

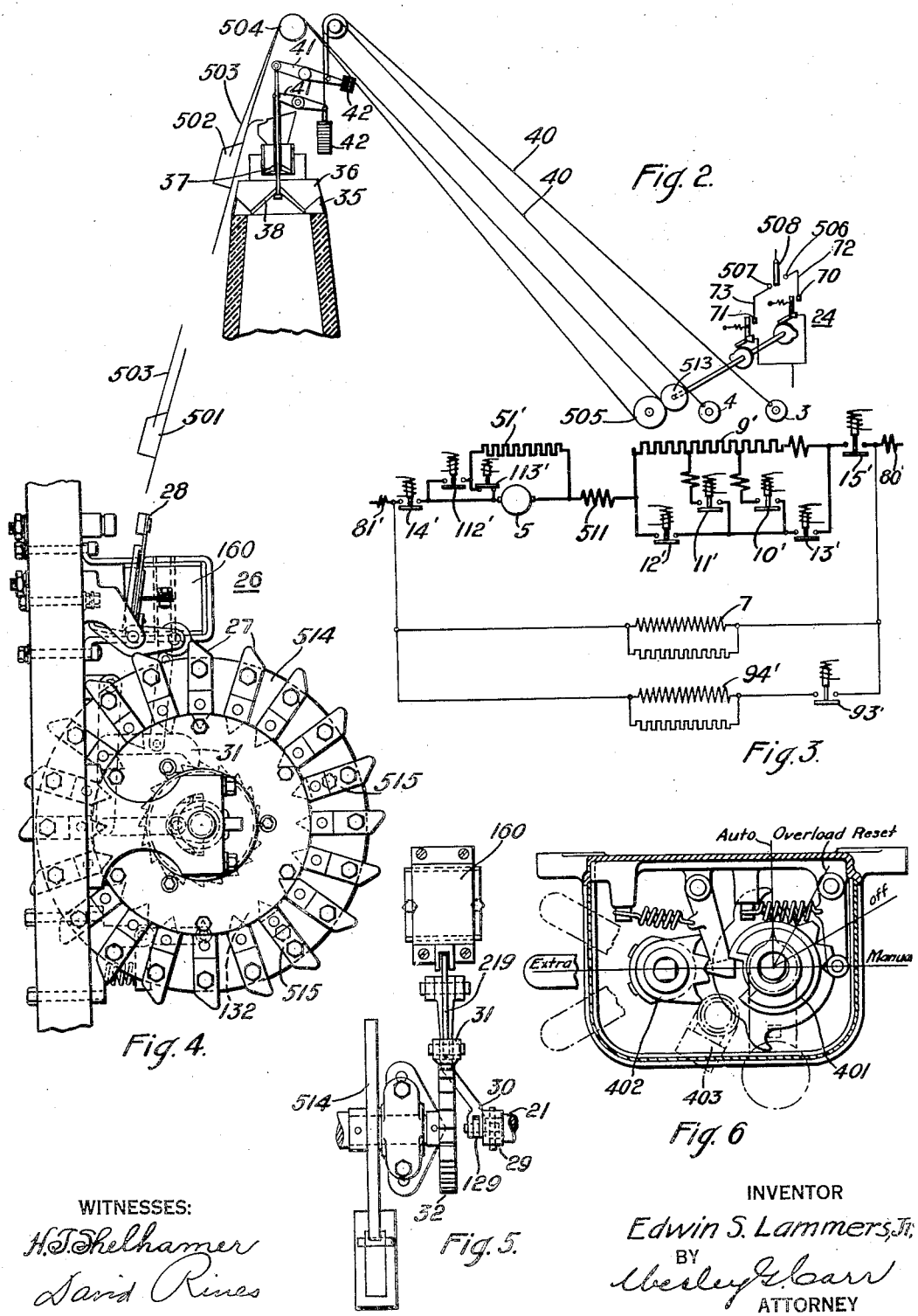

Patented Sept. 2, 1924.

1,506,757

UNITED STATES PATENT OFFICE.

EDWIN S. LAMMERS, JR., OF ELYRIA, OHIO, ASSIGNOR TO WESTINGHOUSE ELECTRIC & MANUFACTURING COMPANY, A CORPORATION OF PENNSYLVANIA.

CONTROL SYSTEM.

Application filed May 7, 1919. Serial No. 295,507.

*To all whom it may concern:*

Be it known that I, EDWIN S. LAMMERS, Jr., a citizen of the United States, and a resident of Elyria, in the county of Lorain and State of Ohio, have invented a new and useful Improvement in Control Systems, of which the following is a specification.

My invention relates to control systems and particularly to systems for controlling electric motors which are employed for operating the bells of blast furnaces.

Blast furnaces are each supplied with a small bell and a large bell, the former of which is designed to be operated, after every unloading of the skip hoist, so as to discharge the load to the large bell and the latter of which is designed for operation, after any desired predetermined number of operations of the small bell, so as to discharge the accumulated loads to the blast furnace. This predetermined number may vary in accordance with the character of the loads, the behavior of the furnace, or other conditions.

The object of my invention is to provide an improved control system for bell-hoist motors which shall automatically effect the operation of the motors in any preselected sequence, which sequence may be changed at will.

A further object of my invention is to provide such a system with the use of which either motor may be operated through an additional cycle of operation without affecting the said sequence.

Another object of my invention is to provide such a system in which the said sequence of operation will be unaffected by voltage failure.

Still another object of my invention is to provide a novel control system for a motor whereby the motor may be automatically accelerated, its speed decreased, its speed again increased and the motor finally brought to a smooth stop.

Other objects of my invention will appear hereinafter and will be pointed out in the appended claims.

According to the present invention, each motor operates a number of limit switches which, in turn, control its operation and one of which controls the operation of the other motor. A sequence switch is mechanically connected to the limit switches operated by the small-bell motor which sequence switch, after a predetermined number of operations of the small-bell motor,— which number may be changed at will,— closes the circuit of the large-bell motor. The sequence switch is operated step-by-step through a ratchet-and-pawl mechanism, which may be rendered inoperative, when it is desired to operate either bell through an extra cycle of operations, without affecting the predetermined sequence. The limit switches effect the acceleration of the motor both when the corresponding bell is opened and when it is closing. Provision is made for dynamically braking the motor as the bell approaches its limits of travel.

In the accompanying drawings, Figure 1 is a diagrammatic view of circuits and apparatus embodying my invention; Fig. 2 is a view, partly in elevation and partly in section, of a portion of a charging mechanism of a blast furnace; Fig. 3 is a schematic view of the circuits of one of the motors; Fig. 4 is a front elevational view of the sequence switch; Fig. 5 is a fragmentary view of part of the mechanism for the sequence switch, and Fig. 6 is a view of a controller which may be employed in substitution for the push-button switches and the knife-blade switch shown in Fig. 1.

Referring particularly to Fig. 1, line conductors 1 and 2, which may be connected to any suitable source of direct current, supply energy to electric motors 3 and 4 having, respectively, armature windings 5 and 6, series-field-magnet windings 511 and 512, and shunt-field-magnet windings 7 and 8. The motors 3 and 4 may be employed, respectively, to control the small bell and the large bell of a blast-furnace top.

The motors 4 and 3 are respectively provided with starting resistors 9 and 9' which are respectively controlled by a series of electromagnetically operable switches 10, 11 and 12, and 10', 11' and 12'. The circuits of the motors are respectively controlled by electromagnetically operable line switches 13, 14 and 15, and 13', 14' and 15'. The switches 13 and 13' are respectively provided with mechanically connected switches 113 and 114 and 113' and 114', the switches 113 and 113' controlling dynamic-braking circuits for the corresponding motors 4 and 3 through resistors 51 and 51', respectively, while the switches 114 and 114' respectively establish circuits for the actuating coils of the pairs of switches 14 and 15, and 14' and 15'. Dynamic-braking circuits may be established also through the resistors 51 and 51' by electromagnetically operable switches 112 and 112', respectively.

A plurality of limit switches 16, 17, 117, 18, 19 and 20 for motor 4 and 16', 17', 117', 18', 19' and 20' for motor 3 are controlled by cam mechanisms which are operated by shafts 21 and 21' that are respectively rotatable by the motors 4 and 3. The motors 3 and 4 and the shafts 21 and 21' are diagrammatically illustrated as belt-connected. In practice, the shafts are gear-connected to the respective motors. The limit switches 16 and 117 and 16' and 117' are adapted to be closed by springs and to be opened by the cam mechanisms. The switches 17, 18, 19 and 20 and 17', 18', 19' and 20' are designed to be kept open by springs and to be closed by cam mechanisms. In the normal, inoperative, illustrated positions of the motors, the switches 16 and 16' are maintained open and the switches 20 and 20' are maintained closed by their respective cams. The switches 17, 18 and 19 and 17', 18' and 19' are maintained open by their springs and the switches 117 and 117' are maintained closed by their springs. The switches 16 and 16' create holding circuits for the coils 110 and 110' of the switches 13 and 13', respectively. The switches 17 and 17' control circuits for the actuating coils of the pairs of switches 14 and 15, and 14' and 15'. The switches 117 and 117' are adapted initially to establish the circuits of the actuating coils 110 and 110' of the switches 13 and 13', respectively. The switch 17 closes when the switch 117 opens and opens when the switch 117 closes. A similar statement applies with respect to switches 17' and 117'. The purpose of this arrangement, as will appear, is to provide against voltage-failure conditions. The switches 18 and 18' are adapted to control the actuating coils of relays 22 and 22', respectively. The switches 19 and 19' control the circuits of the actuating coils of the switches 112 and 112', respectively. The switches 20 and 20', which are respectively operable by the motor 4 and the motor 3, respectively, control the circuit of the other motor.

Skip hoists are usually provided with two skips 501 and 502, one of which may be lowered, empty, while the other is raised, loaded. The skips are connected to opposite ends of a cable 503 which is wound over a pulley 504 and around a winding drum that is connected to, and operated in reverse directions by, a motor. In Fig. 2, the winding drum and the motor are both shown at 505. The motor 505 is periodically reversed to reverse the operation of the drum in order to raise the one skip and to lower the other, the one having, in the meantime, been loaded and the contents of the other discharged. As the cable to the skip 501 unwinds, that to the skip 502 winds, and vice versa. Almost immediately after each commences its return movement, after its contents have been dumped, a mechanism 513 operated by (it is usually geared to) the skip hoist motor 505 is adapted to actuate a limit switch 24 into engagement with the one or the other of two stationary contact members 70 and 71, depending upon whether a particular one of the two skips 501 and 502 is being raised or lowered. The limit switch 24 is usually of the cam type. This actuation is momentary only. The contact members 70 and 71 are respectively connected, by conductors 72 and 73, to contact members 506 and 507 that are adapted to be closed by a master switch 508 which controls the direction of operation of the skip-hoist motor 505 through reversing switches, the actuating coils of which are diagrammatically illustrated at 509 and 510. Obviously, the limit switch 24 will be actuated not only just following the commencing of a lowering operation of the skip, but also just before the hoisting operation is ended. In the latter case, the actuation of the limit switch 24 will be without effect, because the circuit for the small-bell motor 3, though closed at the limit switch 24, is open at the master switch 508. On the downward movement, however, the circuit of the motor 3, which is controlled by the limit switch 24, is already previously partly closed at the contact member 506 or the member 507, as the case may be, by the master switch 508, which must have been actuated, to effect the reversal of the motor 505, before the skip commences its downward operation. The conductors 72 and 73 are thus connected to the positive line conductor 1, or to some other conductor which is connected to the positive line conductor 1, by the master switch 508. In each of its two positions, the limit switch 24 closes a circuit for the actuating coil of the relay 22' which controls the circuit of the small-bell motor 3.

The operation of the large-bell motor 4 is controlled by a sequence switch 26 which, shown in larger proportions in Fig. 4, comprises a series of movable cam members 27 for momentarily actuating a movable switch 28. The cam members 27 are adjustably, longitudinally, arranged within equally spaced radial sockets, so that they may each occupy either a position within the circumference of a disk 514, as shown at 515, or a position in which it extends beyond the circumference. In the diagrammatic showing of Fig. 1, those cam members 27 only are shown which extend beyond the circumference. When the cam members 27 are within the limits of the disk 514 they cannot affect the switch 28. Such of the cam members 27 as extend beyond the disk may close the switch 28. In the full-line positions of Fig. 4, all the cam members 27 are effective to control the switch 28. As it is usually desirable to operate the large-bell motor 4 after a series of operations of the small-bell motor 3, which is a factor of 20, it is desirable to have twenty cam members 27 equally spaced along the circumference of the disk 514. The number of operations of the small-bell motor to every operation of the large-bell motor 4 determined by the number of cam members 27 which are fixed in positions in which they extend beyond the confines of the disk 514.

The sequence switch 26 is adapted to be driven from the shaft 21' which is operated by the small-bell motor 3 by a crank 29 which, through a link 129, actuates a toggle 30 for effecting a back-and-forth pivotal movement of a pawl 31 which engages a ratchet member 32 that is rigidly connected to the sequence switch 26. The ratchet member 32 and the disk 514 are rigidly connected to rotate together, but their only connection to the shaft 21 is through the pawl 31. At each complete revolution of the shaft 21, therefore, the pawl 31 effects a partial rotation of the ratchet member 32 and, therefore, of the sequence switch 26, equal to the angular space between two successive cam members 27, after which the pawl 31 is withdrawn from engagement with one tooth of the ratchet member 32 and becomes placed in engagement with the next consecutive ratchet tooth. As the ratchet member 32 has as many teeth as there are cam members 27, preferably twenty in number, one complete revolution of the sequence switch 26 will be effected after twenty complete revolutions of the shaft 21. If, for example, every fourth cam member 27 is adjusted to a position in which it extends beyond the disk 514, there will be five operations of the motor 4 and twenty operations of the motor 3, during one complete revolution of the sequence switch 26. An accentuating device 132 is provided for maintaining the sequence switch 26 in the exact position to which it is actuated by the pawl 31. As the sequence switch 26 forms the subject-matter of a copending application by C. H. Hodgkins, Serial No. 281,505, filed Mar. 8, 1919, and assigned to the Westinghouse Electric & Manufacturing Company, it is thought unnecessary to explain its structure in greater detail.

Reference may now be had to Fig. 2 in which the charging mechanism of a blast furnace and the controlling motors therefor are diagrammatically illustrated in operative relation. The top of a blast furnace 35 is provided with a charging chamber 36, having openings controlled by a small bell 37 and a large bell 38. The motor 3 is operatively connected, by reduction gearing, (not shown) to the small bell 37, and the motor 4 is similarly connected to the large bell 38, through cables 40, operating upon levers 41 which are supplied with counterweights 42. The counterweights 42 are designed to close the bells 37 and 38, so that the power delivered by the motors 3 and 4, during the opening operation, is very small. The motors 3 and 4 operate, in opposition to the forces exerted by the counterweights, to open the bells. The counterweights 42, moreover, prevent overloading the bells under such conditions, opening of their own accord, even though the motors should fail to operate. The motors 3 and 4 are continuously operated, at varying speeds, through complete cycles, each comprising an entire revolution, to effect the successive opening and closing of the bells.

The motors are successively automatically operated through their cycles of operation when a two-position knife switch 75 occupies its upper position. When the knife switch 75 occupies its lower position, the small bell may be operated through an extra cycle by means of a push button 60 and the large bell may be operated through an extra cycle upon the actuation of a push button 61. The extra operations may be effected without disturbing the sequence of operation of the motors because the pawl 31 is adapted to be actuated to its inoperative position by a solenoid 160. A push button 161 is provided for resetting overload relays 80, 80', 81 and 81'.

The shunt field-magnet winding 7 of the small-bell motor 3 is normally excited by a circuit extending from the positive line conductor 1, through a knife switch 84' (shown in the lower left-hand corner of Fig. 1), the actuating coil of the overload relay 81', the shunt field-magnet winding 7, the actuating coil of a field relay 42', the actuating coil of the overload relay 80' and the knife switch 84', to the negative line conductor 2. The corresponding circuit for the field-magnet winding 8 is shown in a little simpler form to prevent unnecessary complication of the drawings.

Assuming that the skip-hoist mechanism has been operated to hoist one of the skips 501 and 502 to empty it, the limit switch 24 will be automatically actuated into engagement with one of the contact members 70 and 71. Nothing of interest takes place, because the master switch 508 is in engagement with that one of the contact members 506 and 507 which controls the circuit of the motor 3 in conjunction with that contact member 70 or 71 which is not closed by the limit switch 24. The master switch 508 is thereupon actuated to reverse the skip motor 505. Upon the skip commencing to lower, the limit switch 24 will again be actuated. A circuit will then be established from the skip-hoist-motor master switch 508, which, as above explained, is connected to the positive line conductor 1 through the one or the other of the contact members 506 and 507, as the case may be, by the conductor 72 or 73, through one of the contact members 70 and 71, the limit switch 24, a stationary contact member 74 of the knife switch 75, one of the blades of the knife switch 75, by a conductor 76, through the actuating coil 44, which controls a latch 78' for the relay 22 of the small-bell motor 3, to one of the blades of a control knife switch 79, which is connected to the negative line conductor 2. The latch 78' will thereupon be actuated, in opposition to the force of a spring, to release the relay 22, which will thereupon become closed by gravity. A circuit will now be established from the positive line conductor 1, through the switch 79', by way of a conductor 82, through the field relay 42', which is normally closed by the above-traced circuit for the shunt field-magnet winding 7, the overload relay 81' and the limit switch 20 which is connected to the motor 4, and which is normally closed, by way of a conductor 87, through the relay 22', by way of a conductor 88, through the limit switch 117', which is connected to the motor 3, by way of a conductor 89, through the actuating coil 110' of the switch 13', by way of a conductor 90, through the overload relay 80 and by way of a conductor 91, through the switch 79', to the negative line conductor 2. The switch 13 will be closed by its actuating coil 110.

A second circuit will be established from the relay 22 which, according to the circuit just traced, is connected to the positive line conductor 1, by way of the conductor 92, through the actuating coil of a brake relay 93, to the overload relay 80, which is connected, by the conductor 91, to that blade of the switch 79 which is connected to the negative line conductor 2. The brake relay 93' will thereupon be actuated to close the circuit of a brake coil 94', which extends from the line conductor 1, through the switch 84 and the actuating coil of the overload relay 81', by way of a conductor 95, through the brake coil 94', the relay 93, the actuating coil of the overload relay 80 and the switch 84', to the negative line conductor 2. The coil 94' will thereupon be energized to release the brake and to permit the motor 3 to operate.

The closing of the switch 13' effects the opening of the switch 113' and the closing of the switch 114, which switches are mechanically connected to the switch 13'. The switch 114' effects the closing of a circuit from the relay 22', which is connected to the positive line conductor 1, by way of the conductor 92', through the switch 114', by way of a conductor 96', through the actuating coil of the switch 14' and the overload relay 80', by way of the conductor 91', and through the switch 79, to the negative line conductor 2. The consequent closing of the switch 14' effects the closing of switches 97' and 98 which are mechanically connected thereto, the switch 97' establishing a circuit for the actuating coil of the switch 15 from the switch 114', which is connected to the positive line conductor 1, by way of the conductor 96', through the switch 97', the actuating coil of the switch 15' and the overload relay 80', to the conductor 91', which is connected to the negative line conductor 2 by the switch 79'. The switch 98' establishes a holding circuit for the actuating coil of the switch 14' that is independent of the switch 114', so that the switch 13' may later be opened, to effect the closing of the switch 113' for dynamic braking, without effecting the opening of the switches 14' and 15'.

The switch 13' is somewhat heavier than the switches 14' and 15' and, therefore, probably a little slower in closing. If the switch 114' were omitted, and the switches 13', 14' and 15' were arranged to be closed independently of each other, there would be a likelihood of the switches 14 and 15 closing before the switch 13', and, therefore, before the opening of the switch 113'. Once the switches 14' and 15' became closed before the switch 13', however, the switch 13' would remain open, because, as the switches 14' and 15' would close the motor circuit, the dynamic-braking circuit comprising the resistor 51' and the coil 210' would become energized, and the coil 210' would overpower the coil 110' and prevent the closing of the switch 13'. Unless the switch 113' opens before the switches 14' and 15' close, therefore, the motor cannot be accelerated; and this initial opening is ensured by the switch 114'.

The switch 97' performs a similar service. If the switches 14' and 15' were arranged to be closed independently of each other, there would be a likelihood of the switch 15' closing before the switch 14'. The relay 49' would thus become closed to effect the closing of the resistor-short-circuiting switch 10' before the motor circuit becomes closed by the switch 14'.

By means of the above-described design, all possible undesirable effects resulting from possible sluggish operation of the switches 13', 14' and 15' are avoided.

Energization of the actuating coils of the switches 14' and 15' results in the closing of those switches, thereby closing the motor circuit, which extends from the positive line conductor 1, through the switch 84', the actuating coil of the overload relay 81' and the switch 14', by way of conductors 198 and 99, through the armature 3, the series-fieldmagnet winding 511, the resistor 9', the actuating coil of a relay 49', which is mechanically connected to the switch 15', the switch 15', the actuating coil of the overload relay 80' and the switch 84', to the negative line conductor 2.

It will be noted from the above discussion that the switch 13' does not, at this time, close the motor circuit, but the closing of this switch is essential to the operation of the switch 114', which is mechanically connected thereto, and which controls the circuits of the actuating coils of the switches 14' and 15', these, in turn, closing the motor circuit. The switch 13' performs an additional function in connection with short-circuiting the resistor 9', which will later become apparent, which function is dependent upon the switch 13' occupying its closed position. If the switches 14' and 15' were arranged to be closed before the switch 13', a dynamic-braking circuit would be closed through the switch 113', which would prevent the closing of the switch 13'. Hence the necessity for closing the switch 13' before the closing of the switches 14' and 15'.

Upon the establishing of the above-traced circuit for the motor, the motor 3 will commence to operate at slow speed the resistor 9' being in series with the armature 5. The motor will thereupon commence to rotate the shaft 21', which will effect the momentary closing of the switch 18 by its cam. A circuit will then be established from the positive line conductor 1, through the switch 79', by way of conductors 82 and 101, through the switch 18', the actuating coil of the relay 22' and the switch 79', to the negative line conductor 2. The actuating coil of the relay 22' will thereupon open the relay, in opposition to the force of gravity, and the relay will become held in open position by the latch member 78'. The opening of the relay 22' will, of course, cause the opening of the above-traced circuits controlled by it. Just before the closing of the switch 18', however, the switch 16' will be closed by its spring. The circuit of the actuating coil of the switch 110' will then extend from the conductor 87,—which is connected to the positive line conductor 1 by the field relay 42', the overload relay 81' and the limit switch 20 which is controlled by the motor 4,—by way of a conductor 100, through the limit switches 16' and 117', by way of the conductor 89, through the coil 110', and by way of the conductor 90, to the overload relay 80', which is connected to the negative line conductor 2. The relay 22' becomes thus reopened, so that a second operation of the motor 3, upon completion of its cycle, is prevented until after the relay 22' becomes again closed, as above described, upon the limit switch 24 becoming again actuated by the skip-hoist mechanism.

It may be stated, at this point, that additional controlling circuits are created for the actuating coils of the switches 14' and 15' by the switch 17', which becomes closed at the same time that the switch 117 is opened, toward the end of the cycle of operation of the motor 3. The controlling circuit for the actuating coil of the switch 14 may be traced from the limit switch 20, which is controlled by the motor 4 and which, as above explained, is connected to the positive line conductor 1, by way of the conductor 87, through the limit switches 16' and 17' which are controlled by the motor 3, by way of a conductor 102, through the actuating coil of the switch 14' and the overload relay 80', to the conductor 91', which is connected to the negative line conductor 2. The switch 14' being thus maintained closed, the actuating coil of the switch 15' will be maintained closed by the switch 97', which is mechanically connected to the switch 14'. Once the switches 14' and 15' have been closed, therefore, they will remain closed until the motor 3 has completed a cycle of operation. The advantage of the above-described additional circuits for the actuating coils of the switches 14' and 15', that are under the control of the switch 17', is that, if the switch 13' became opened, as by failure of voltage, toward the end of the cycle of operation of the motor 3, it would be impossible to restart the motor, in order to effect a completion of the cycle, because it would be impossible to close the switch 13', the relay 22' and the switch 117' being open, unless some method were provided for energizing the actuating coils of the switches 14' and 15' at this time in some other manner than through the switch 114', which is mechanically connected to the switch 13'. Ordinarily, the function performed by the switch 17' after voltage failure is performed by the switch 98'.

It may be pointed out, too, at this point, that, owing to the particular arrangements of circuits described above, a failure of voltage will result merely in postponing the completion of the cycle of operations for the motor 3,—as also of the motor 4,— until the return of power to the line, but it cannot prevent such operation, which prevention, if it were possible, would disturb the sequence of operation between the motors 3 and 4. A failure of voltage at any intermediate point of the cycle cannot prevent a completion of the cycle because of the various limit switches controlled by the shaft 21', at least one of which is always closed so as to maintain the controlled circuit closed except at the very beginning and at the very end of a cycle. It has just been pointed out how prevention of the completion of the cycle is effected in case the switch 13' becomes opened by the failure of voltage toward the end of the cycle of operation. The construction of the relay 22' and the method of its connection to the control circuits effects a similar result at the beginning of a cycle, because, so long as the relay 22' remains in its actuated position, the motor 3 must automatically recommence its operation, from the point where the operation was stopped, upon return of power to the line; and, of course, the relay 22' will occupy its actuated position, by gravity, until the control of the motor circuit is transferred to the limit switch 16'.

If failure of voltage takes place when the motors occupy their initial positions, there will naturally be no interference with their sequence of operation because both relays 22 and 22' will be maintained in their open positions by their latches 78 and 78'. This cannot interfere with the sequence of operation of the two motors because the relays 22 and 21' do not operate even to initiate the operation of the motors. Herein lies the advantage of a relay of the type illustrated at 22. If a relay of the ordinary type were employed, a failure of voltage would effect the de-energization of the actuating coil of the relay, the relay would become closed by gravity and the motor 3 would consequently operate through an extra cycle. But were the small-bell motor 3 to operate through an extra cycle, the sequence switch 26 would be operated an extra notch and the sequence of operation of the two motors would be thereby disturbed. Under no circumstances, if voltage failure is to be guarded against, should there be any operation of the motor 3 except from the switch 24.

Once the limit switch 24 or the switch 28 has been actuated, therefore, the motor 3 or the motor 4 must sooner or later complete its cycle of operation, irrespective of voltage failure; and there can be no disturbance in the sequence if there is voltage failure at other times. There can thus be no disturbance in the sequence of the operation of the motors 3 and 4 at any time. This is an important feature of my invention, as it obviates the necessity of an inspection after every voltage failure and a possible re-adjustment of the sequence switch.

Resuming now the description of the operation after the circuit of the motor 3 has become closed by the switches 14' and 15', it was found that the motor circuit includes the energizing coil of the current-limit relay 49', which is mechanically connected to the switch 15'. So long as the current traversing the motor exceeds a predetermined value, the relay 49' will be maintained open, though mechanically released upon the closing of the switch 15'. As soon as the current traversing the motor 3 falls to the predetermined value, the relay 49' will become closed by gravity, whereupon a circuit will be established for the actuating coil of the switch 10', this circuit extending from the positive line conductor 1, through the switch 79', by way of the conductor 82, through a switch 103', which is mechanically connected to the switch 112' and which is closed when the switch 112' is open, the relay 49', a switch 104' which is mechanically connected to the switch 12' and which is closed when the switch 12' is open, and the actuating coil of the switch 10', and, by way of a conductor 105, through the switch 79', to the negative line conductor 2. The switch 10' will thereupon be actuated by its coil to closed position to effect the short-circuiting of a portion of the resistor 9'.

The circuit for the motor will now extend from the positive line conductor 1, through the switch 84', the actuating coil of the overload relay 81' and the switch 14', by way of conductors 198 and 99, through the armature 5, the series field-magnet winding 511, a large portion of the resistor 9', the energizing coil of a relay which is mechanically connected to the switch 10', and the switch 10', by way of a conductor 106, through the switches 13' and 15', the actuating coil of the overload relay 80' and the switch 84', to the negative line conductor 2. The switch 13' thus performs a useful function in connection with the short-circuiting operation of the resistor 9'.

The circuit for the motor, just traced, comprises the actuating coil of the current-limit relay which is mechanically connected to the short-circuiting switch 10'. The relay will, therefore, remain open until the current traversing the motor circuit falls to a predetermined value. Upon the current falling to this value, a circuit will be established from the conductor 82, which is connected to the positive line conductor 1, through the current-limit relay which is mechanically connected to the switch 10' and the actuating coil of the switch 11', by way of the conductor 105, to that blade of the switch 79' which is connected to the negative line conductor 2. The energization of this circuit will cause the closing of the switch 11', whereupon a second portion of the resistor 9' will become short-circuited. The motor will be further accelerated, so as to operate the small bell 37 at greater speed.

When a current-limit relay, which is mechanically connected to the switch 11' becomes closed in accordance with the value of the current traversing the motor circuit, a circuit will be established from the conductor 82, which is connected to the positive line conductor 1, through the current-limit relay which is mechanically connected to the switch 11' and the actuating coil of the switch 12′, by way of the conductor 105, through the switch 79′, to the negative line conductor 2. The consequent closing of the switch 12′ will effect the short-circuiting of the remaining portion of the resistor 9′, the motor circuit extending, as before, from the positive line conductor 1 to and through armature 5 and the series field magnet winding 511 and through the switch 12′, to the switch 13′, which is connected to the negative line conductor 2. The motor will now operate at normal speed.

The closing of the switch 12′ effects the opening, of course, of the switch 104′, which is mechanically connected thereto and this, in turn, breaks the circuit of the actuating coil of the switch 10′. The switch 10′, becoming open, will cause the opening of the current-limit relay that is mechanically connected thereto, to effect the opening of the circuit of the actuating coil of the switch 11′. The switch 11′, too, will thereupon be opened and, in turn, will effect the opening of the current-limit relay which is mechanically connected thereto and which controls the circuit of the actuating coil of the switch 12′. This would have the effect of breaking the circuit of the actuating coil of the switch 12′, but a maintaining circuit for this coil is established by a switch 107′ which is mechanically connected to the switch 12′. This circuit extends from the conductor 82, which is connected to the positive line conductor 1, through the switch 103′, the relay 49′, the switch 107′ and the actuating coil of the switch 12′, by way of the conductor 105, to the negative line conductor 2. Though the switches 10′ and 11′ will thus remain open, the switch 12′ will be maintained closed to maintain short-circuited the resistor 9′, whereby the motor 3 will continue to operate at normal speed.

Continued operation of the motor 3, of course, results in continued rotation of the shaft 21′. The switch 19′ will ultimately be closed, upon the shaft 21′ reaching a predetermined position in its rotational path of movement, whereupon a circuit will be established, which will extend from the line conductor 82, which is connected to the positive line conductor 1, by way of the conductor 101, through the limit switch 19′ and the actuating coil of the switch 112′, by way of the conductor 105′, to the negative line conductor 2′. Energization of this circuit will effect the closing of the switch 112′ and the opening of the switch 103′ that is mechanically connected thereto. The opening of the switch 103 effects the opening of the circuit of the actuating coil of the switch 12′, which switch will thereupon become opened by gravity to reinsert the resistor 9′ into the armature circuit. The closing of the switch 112′ establishes a dynamic-braking circuit for the motor, which circuit extends from one terminal of the armature 5, by way of the conductors 99 and 108, through the switch 112′, by way of a conductor 109 and the dynamic-braking resistor 51′, to the other terminal of the armature 5. As the switch 112′ is closed by the limit switch 19′ when the motor 3 has effected nearly one half a complete revolution, it will be obvious that this dynamic-breaking circuit of the motor operates to retard the operation of the motor at a time when the small bell 37 is reaching the limit of its upward movement. The motor is thus slowed down to allow the material sufficient time to slide off the bell 37 into the charging chamber 35.

Upon the motor completing a little more than half of one revolution, the limit switch 19′ will again become opened to break the circuit of the actuating coil of the switch 112′, which switch will thereupon open by gravity to effect the opening of the above-described dynamic-braking circuit for the motor. The motor will thereupon start to operate in the same manner as it operated in the beginning, with the resistor 9′ entirely in circuit with the armature 5. The switches 10′, 11′ and 12′ will thereupon become re-closed in order, in the manner above described, in connection with the description of the accelerating operation of the motor, until the resistor 9′ becomes again short-circuited and the motor again attains its normal speed. At this time, the bell 37 will be approaching its lower limit of travel. The shaft 21′ continuing to operate at the same time with the motor 3, the switch 117′ will become opened, whereupon the circuit of the actuating coil 110′ of the switch 13′ will become opened, and, upon the consequent de-energization of the coil 110′, the switch 13′ will fall open. This takes place toward the end of the operation of the motor 3. A second dynamic-braking circuit for the motor will then be established from one terminal of the armature 5, by may of the conductor 99, through the switch 113′, a coil 210′ and the resistor 51′, to the other terminal of the armature 5. The coil 210′ operates upon a core member to maintain the switch 13′ open and the switch 113′ closed so long as current of appreciable value flows through the dynamic-braking circuit. As the small bell 37, therefore, approaches its lower limit, the motor will be slowed down and finally brought to a smooth stop. This permits the bell to seat easily. After the motor has slowed down sufficiently, the switch 16′ becomes opened to permit the opening of the switches 14′ and 15′ and the setting of the brake.

It will be obvious that the motor 3 is dynamically braked whenever it occupies its initial position. This insures a positive stop and prevents drifting. The magnetic brake 94' is also, of course, operative at this time.

As described and shown, the switch 17' closes upon the switch 117' opening, and the switch 17' opens as the switch 117' closes. This arrangement is not absolutely essential, however, for, as the coil 210' will prevent a reclosing of the switch 13' until after the switches 14' and 15' have opened, and these, in turn, cannot open until the switch 16' has opened, which effects the opening of the circuit of the coil 110' the switch 117' could be arranged to open momentarily.

It will now appear that the addition of the switch 13' to the switches 14' and 15' for controlling the motor circuit is of particular value at the time when the motor is reaching the end of its cycle of operation. At that time, the switch 13' may open, without an opening of the motor circuit, to effect the closing of the switch 113' for dynamic braking, and to reinsert the starting resistor 9' into the armature circuit. Unless the resistor 9', or some other resistor, were included in the armature circuit, the process of slowing down would be ineffective. A similar function is performed by the switch 103' when the switch 112' is closed at the end of the first half of the cycle of operation.

During the above-described operation of the motor 3 throughout a complete revolution, the shaft 21' has been rotated through a complete revolution. The crank 29 has accordingly operated to actuate the toggle 30 so as to drive the pawl 31 to the left as shown in Fig. 1. The pawl 31, engaging one of the teeth of the ratchet member 32, has rotated this ratchet member 32 through a small angle, equal to one-twentieth of a circumference, and the pawl 31 has then been returned to its initial position, where it engages a succeeding tooth of the ratchet member 32. In this manner, after each complete rotation of the motor 3 and a corresponding complete rotation of the shaft 21', there has been a partial rotation of the ratchet member 32 and of the sequence switch 26 equal, in angular value, to one-twentieth of a circumference. If, after each operation of the ratchet mechanism 32 and of the sequence switch connected thereto, the cam member 27 which is in proximity to the switch 28 occupies a position within the circumference of the disk 514, the operation of the sequence switch will be without effect upon the switch 28. The skip-hoist mechanism will consequently continue to actuate the limit switch 24 in the one direction and in the other, in response to the operation of the skip-hoist controller 508, to effect successive complete operations of the motor 3 and of the sequence switch 26 controlled thereby, until a number of operations of the small bell have been effected, equal in number to the predetermined number of operations desired, as determined by the adjustment of the cam members 27 of the sequence switch 26.

Upon one of the cam members 27, which is operated by the sequence switch 26, closing the switch, after the predetermined number of operations of the small-bell motor 3, a circuit will be established from the positive line conductor 1, through the knife switch 79 which controls the control circuits of the motor 4, by way of a conductor 211, through the switch 28, by way of a conductor 212, to a stationary contact member 213 of the knife switch 75, through one blade of the switch 75, the actuating coil 58 for the latch mechanism 78 of the relay 22 which controls the motor 4, and through the switch 79, to the negative line conductor 2. Upon the energization of the coil 58, the latch 78 will be actuated, in the manner described in connection with the commencement of the operation of the motor 3, to release the relay 22, which will become closed by gravity. A circuit will then be established from the positive line conductor 1, through one blade of the switch 79, which controls the control circuits for the motor 4, the field relay 42, the actuating coil of which is in circuit with the field-magnet winding 8, and the overload relay 81, by a conductor 86, through the limit switch 20', which is controlled by the motor 3, the relay 22, the limit switch 117, which is controlled by the motor 4, the actuating coil 110 of the switch 13, which controls the circuits of the motor 4, the overload relay 80 and the switch 79, to the negative line conductor 2.

It will be noted that the energization of the actuating coils 110' and 110 of the switches 13' and 13 for controlling the circuits of the motor 3 and the motor 4, respectively, are controlled by the limit switches 20 and 20' which are controlled by the motor 4 and the motor 3, respectively, so that neither motor can operate unless the other occupies its inoperative position.

Upon the closing of the switch 13, the switches 14 and 15 will be closed, the brake relay 93 having previously closed, in a manner identical with that described above in connection with the description of the operation of the motor 3. The accelerating switches 10, 11 and 12 will be closed, as before described, to short-circuit the resistor 9, the switch 112 will be closed to dynamically brake the motor when the bell 38 reaches its upper limit of movement, the switches 10, 11 and 12 will again be closed in order again to accelerate the motor, the switch 13 will then be opened, the switch 113, which is mechanically connected thereto, establishing a dynamic-braking circuit for the motor 4 and the switches 14 and 15 will finally be opened to stop the motor 4. As in the case of the operation of the limit switch 24, the switch 28 need be but momentarily closed in order to bring about this cycle of operation.

In case the overload relays 80 and 81 or 80' and 81' of the respective motors are opened by overload conditions, they may be reclosed by means of the push-button switch 161. The circuits may be traced from the positive line conductor 1, through one blade of the switch 79, which governs the control circuits for the motor 4, and the push button 161, to the junction point 214. From this point, parallel circuits may be traced, the one through the actuating coils of the latches which control the overload relays 80 and 81 of the motor 4 by way of a conductor 215, through the switch 79, to the negative line conductor 2, and the other through the actuating coils, which control the latches of the overload relays 80' and 81' for the motor 3, and through the switch 79', which controls the control circuits of the motor 3, to the negative line conductor 2.

The above-described automatic operation of the large and small-bell motors, according to a predetermined sequence, is dependent upon the switch 75 occupying the upper of its two positions to engage the contact members 213 and 74. If the switch 75 be actuated to its lower position, into engagement with contact members 216, 217 and 218, it will be possible to operate either the large or the small-bell motor independently of the operation of the other motor and without disturbing the above-described sequence of operation.

Assuming, then, that the switch 75 occupies the lower of its two positions, a circuit may be traced, upon the actuation of the push-button 60, from the positive line conductor 1, through the switch 79' for the small-bell motor 3, by way of a conductor 315, through the push-button switch 60, the contact member 217 and the middle blade of the switch 75, by way of the conductor 76, through the coil 44 and the switch 79', to the negative line conductor 2. It will be noted that the effect is to transfer the control of the coil 44 from the limit switch 24 to the push-button switch 60. The operation of the small-bell motor 3 will obviously be, in other respects, the same as already described.

In similar fashion, a control circuit may be traced through the push-button switch 61 from the positive line conductor 1, through one blade of the switch 79, which controls the control circuits for the motor 4, the switch 61, the contact member 216, the switch 75, the coil 58, and the other blade of the switch 79, to the line conductor 2. The effect of the operation of the switch 75 to its lower position and of the push-button switch 61, therefore, is to transfer the control of the coil 58 from the switch 28 to the push-button switch 61. An extra operation of the large-bell motor 4 may thus be obtained, the operation being, in other respects, the same as already described.

When the switch 75 occupies its lower position, an additional circuit may be traced from the positive line conductor 1, through the switch 79', which controls the control circuits for the motor 3, by way of conductors 315 and 318, through the switch 218, the right-hand blade of the switch 75 and the actuating coil 160 of a member 219, which is pivotally connected to the pawl 31, by way of the conductor 105 and through the switch 79', which controls the control circuits for the motor 3, to the negative line conductor 2. The member 219 is thus actuated to raise the pawl 31 out of engagement with the ratchet member 32, whereby the motors 3 and 4, when actuated by the push-button switches 60 and 61, will be operated without effecting the operation of the ratchet member 32 and whereby the sequence of operation between the two motors may thus not be interfered with.

The controlling mechanism of Fig. 6 may be substituted for the knife switch 75 and the push-button switches 60, 61 and 62. This mechanism consists of a pair of interlocking drums 401 and 402, the former of which may control the circuits of the motor 3 or the motor 4 and the latter of which may determine whether the control circuits shall be arranged for automatic, extra or manual operation. In the illustrated positions of the drums, the circuits are arranged for automatic operation. The drum may be moved to the overload reset position to effect the resetting of the relays 80, 80', 81 and 81'. Upon the actuation of the drum 402 to either of the two dotted-line positions shown, and the release of a lock 403, the drum 401 may be actuated so as to effect a manual operation of the motor. The drum 402, which controls the small-bell motor 3, is adapted to energize the coil 160 in either of its dotted-line positions. This mechanism is fully described and is claimed in my copending application, Serial No. 296,392, filed May 12, 1919.

Many modifications will occur to those skilled in the art. I desire it to be understood, therefore, that the illustrated embodiment of my invention is illustrative purely, and I desire that my invention be construed as broadly as is consistent with the appended claims.

I claim as my invention:

1. The combination with a pair of operating mechanisms and a pair of switches for respectively controlling said mechanisms, of a pair of cam shafts operable through definite cycles of operations for respectively controlling said switches, and a switch controlled by one of said cam shafts for controlling said other cam shaft.

2. The combination with an electric motor, a pair of normally open switches for closing the circuit of said motor and a switch mechanically connected to one of said normally open switches for directly closing a dynamic braking circuit for said motor when said one switch occupies its open position, of means for insuring the automatic closure of first said one normally open switch and then said other normally open switch to render said motor operative.

3. The combination with an electric motor and a switch for closing the circuit of said motor, of a switch having two positions and biased to one of said positions in which it renders said closing switch effective, additional means for rendering said closing switch effective upon the operation of said biased switch, means for maintaining said biased switch in the other of said two positions, and an energizing coil for releasing said maintaining means.

4. The combination with an electric motor having a definite cycle of operation and a pair of switches for closing the circuit of said motor, of a switch controlled by said motor for closing one of said switches, means controlled by said one switch for closing the other of said pair of switches, and means controlled by said motor for closing said other switch independently of said one switch at a predetermined point in said cycle.

5. The combination with an electric motor having an armature, resistors in series therewith and in parallel thereto, a pair of switches for respectively short-circuiting said series-connected resistor and connecting said parallel-connected resistor into circuit, means for actuating said switches, and a switch for closing the circuit of said motor, of a switch connected to said parallel-connected-resistor switch for opening said series-connected-resistor switch, means for again actuating said last-named switch, and a switch mechanically connected to said circuit-closing switch for dynamically braking said motor.

6. The combination with a pair of motors and means for reversing one of said motors, of means operable by said one motor for controlling said other motor, and means for rendering said second-named means ineffective until after the reversal of said one motor.

7. In a blast-furnace-charging mechanism, the combination with a bell motor and a skip-hoist motor, a pair of skips oppositely operable by said skip-hoist motor, a master switch for said skip-hoist motor and a limit switch momentarily operable by said skip-hoist motor to initiate the operation of said bell motor, of means for preventing said initiating operation until after the reversal of said skip-hoist motor.

8. The combination with an electric motor, of a pair of switches for controlling the circuit of said motor, means connected to one of said switches for insuring the operation of the other of said switches subsequently to the operation of said first-named switch, means connected to said other switch for maintaining said other switch in operative position independently of said first-named switch, and means connected to said first-named switch for establishing a dynamic-braking circuit for said motor.

In testimony whereof, I have hereunto subscribed my name this 25th day of April, 1919.

EDWIN S. LAMMERS, Jr.